(12) United States Patent
Divitt (10) Patent No.: US 10,990,970 B2
(45) Date of Patent: Apr. 27, 2021

(54) AUTOMATED FRAUD DETECTION

(71) Applicant: NCR Corporation, Duluth, GA (US)

(72) Inventor: David Divitt, London (GB)

(73) Assignee: NCR Corporation, Atlanta, GA (US)

( * ) Notice: Subject to any disclaimer, the term of this patent is extended or adjusted under 35 U.S.C. 154(b) by 495 days.

(21) Appl. No.: 14/448,071

(22) Filed: Jul. 31, 2014

(65) Prior Publication Data

US 2016/0034897 A1 Feb. 4, 2016

(51) Int. Cl.
*G06Q 20/40* (2012.01)

(52) U.S. Cl.
CPC .................. *G06Q 20/401* (2013.01)

(58) Field of Classification Search
None
See application file for complete search history.

(56) References Cited

U.S. PATENT DOCUMENTS

| | | | | |
|---|---|---|---|---|
| 7,089,592 B2* | 8/2006 | Adjaoute | ............... | G06Q 20/04 726/1 |
| 2011/0016052 A1* | 1/2011 | Scragg | ................... | G06Q 20/02 705/44 |
| 2013/0282583 A1* | 10/2013 | Siddens | ............... | G06Q 20/405 705/44 |

* cited by examiner

*Primary Examiner* — Jason Borlinghaus
(74) *Attorney, Agent, or Firm* — Schwegman, Lundberg & Woessner (57) ABSTRACT

Transaction information for a card transaction is automatically and selectively rendered to a screen of a display presented to a user. The user can edit zero or more operators and selected values provided in the screen and save any such edits. When saved, the transaction information and any edited operators and/or selected values are used to generate a rule for a fraud detection system for immediate application. Subsequent card transactions are evaluated in view of the generated rule to automatically detect any fraudulent transactions present in the card transactions.

11 Claims, 5 Drawing Sheets

AUTOMATED FRAUD DETECTION

BACKGROUND

Consumers are increasingly using credit cards to perform transactions. In the not too distant past, credit card transactions were reserved for relatively few transactions. Now, consumers make purchases at kiosks with credit cards for under a dollar or less, and also pay for groceries, gas, and entertainment, to name a very few, with credit cards. So, the frequency of credit card use is still increasing along with the types of uses.

Credit card fraud is also a major concern for the consumers, retailers, and credit card providers. It seems that a month cannot go by without hearing on the news that a retailer's consumer credit cards or transactions with other credit cards at a retailer's store were compromised.

When this occurs, consumers rush to call their credit card companies to cancel their cards and have new ones issued. Sometimes, however, a consumer uses a credit card online or at a retail establishment many months prior to when the card is actually used for theft purposes. The thief may use it sparingly for small transactions as a test before using it for larger transactions.

In fact, there are a variety of patterns that can emerge from fraudulent credit card usage, and the patterns are continually evolving and changing. This means retailers and credit card providers have to continually update their techniques for detecting fraudulent purchases because in most cases the consumer is indemnified from fraudulent credit card purchases beyond a certain nominal amount, such as fifty dollars. So, the retailers and credit card providers are heavily incentivized to detect fraud as quickly as they can to minimize their exposure.

Retailers and credit card providers have invested heavily in technology and in staff that works twenty-four hours a day three-hundred and sixty-five days a year to detect fraud as quickly as possible. This is time consuming and expensive to say the least.

Moreover, a fair number of transactions occur with consumer debit cards that are tied to consumer checking and banking accounts. These types of transactions have less protection than a credit card transaction to protect the consumer for loss and unfortunately many consumers lack the self-control to use credit cards or lack the credit ratings to obtain credit cards. For these consumers, theft is a significant hardship, since bank accounts can be drained by the thief and the amount of time needed to recover the lost funds either from the consumer's bank and/or a captured thief can be painful for consumers with limited funds.

Gift cards also have exploded in use in recent years. Theft with gift cards leaves a consumer with little options. However, the loss experienced by a consumer that has a gift card stolen is limited to the value of the gift card.

Therefore, there is a need for improved automated mechanisms for assisting in detecting fraud.

SUMMARY

In various embodiments, techniques for automated fraud detection are presented. According to an embodiment, a method for automated fraud detection is provided.

Specifically, a transaction is received and a screen is rendered on a display, the screen having a rule interface populated with selective transaction information for the transaction. A fraud rule is generated for a fraud detection system in response to a user interacting with the rule interface.

DETAILED DESCRIPTION

Figure 1A:
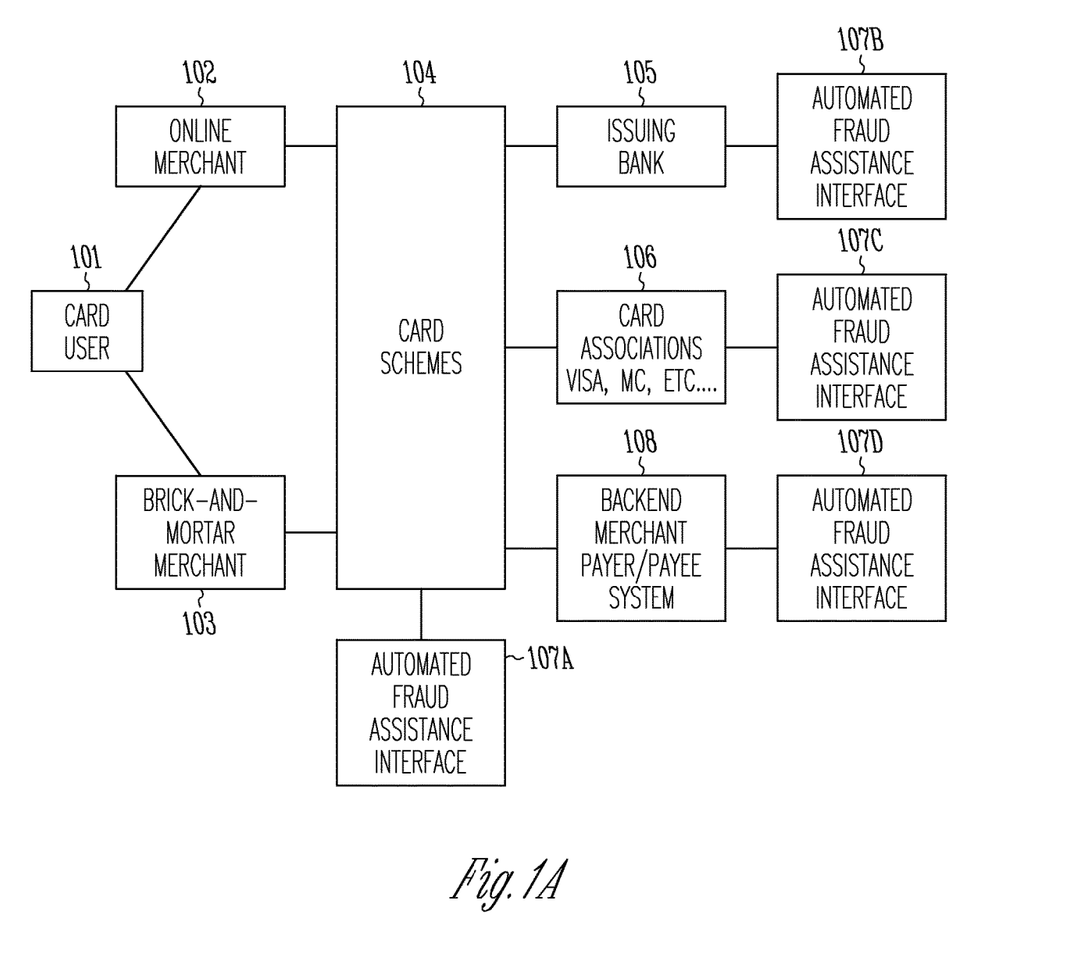
FIG. 1A is a diagram of a transaction processing system for practicing automated fraud detection, according to an example embodiment.

FIG. 1A is a diagram 100 of a transaction processing system for practicing automated fraud detection, according to an example embodiment. It is noted that the diagram is shown in greatly simplified form with only those components necessary for understanding aspects of the teachings presented herein depicted.

Moreover, the components can include a variety of hardware and software components. The software components are implemented as one or more software modules that execute as executable instructions from memory or non-transitory computer-readable storage media on one or more hardware processors. The linkages between the components represent network connections, which can be wired, wireless, or a combination of wired and wireless. However, the linkage between the card user 101 to the online merchant 102 and brick-and-mortar merchant can, in some cases, represent human actions with hardware components (such as a computing device having a browser interface for the online merchant 102, a Point-Of-Sale (POS) device with the brick-and-mortar 103 component, or a cashier manning a POS device with the brick-and-mortar 103 component.

The transaction processing system includes a card user 101, an online merchant 102, a brick-and-mortar merchant 103, a card clearing house 104, an issuing bank 105, one or more card associations 106, instances of an automated fraud assistant interface 107A-107D, and any backend merchant payor/payee system 108.

During a card transaction (gift card, debit card, and/or credit card transaction), a card user 101 supplies a card (or card number and verification information for the online transactions) to an online merchant 102 or a brick-and-mortar merchant 103 (for an in-person transaction (by self-service or through clerk assistance)) for purchasing goods and/or services associated with the card transaction.

The transaction information (including the card details) is routed through card schemes 104 to one or more of: an issuing bank 105, a card association 106, and a backend merchant payer/payee system 108.

In an embodiment, the issuing bank 105, card association 106, and/or the backend merchant payer/payee system 108 are networked (locally or externally) to their individual instances of the automated fraud assistant interface 107A-107D.

Each instance of the automated fraud assistant interface 107A-107D include a user-facing interface and a back-end rules engine. The user-facing interface allows a user (such an analyst) at the issuing bank 105, the card association 106, and/or the backend merchant payer/payee system 108 to manually view the transaction and transaction information in a screen rendered to a display.

Figure 1B:
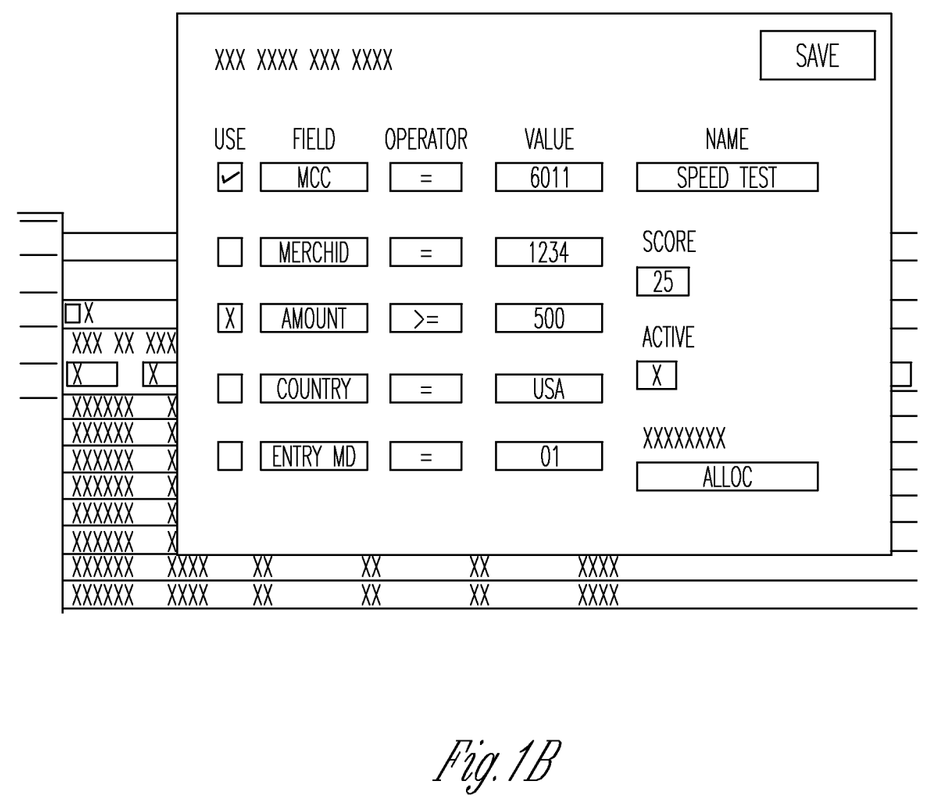
FIG. 1B is a sample transaction screen for a card transaction render by the transaction processing system of the FIG. 1A, according to an example embodiment.

An example transaction screen is shown in the FIG. 1B. The automated fraud assistant interface (one of 107A-107D) renders the transaction screen of the FIG. 1B based on a selection of a transaction made by the user from a list of available transactions (as seen to the side of the transaction screen).

It is noted that an automated process may automatically interact with any of the instances of the automated fraud assistant interface 107A-107D via Application Programming Interface (API) calls to render the transaction screen automatically to the display of the user, such as when the automated process (fraud detection system) determined a potential fraudulent transaction or a transaction that needs inspection by the user. So, the user can select a particular transaction or the user can be automatically supplied a particular transaction for inspection. The generated list may be a list of known or suspected fraudulent transactions. An enterprise's (issuing bank 105, card association 106, or backend merchant payer/payee system 108) fraud system may also supply the list as shown in the FIG. 1B through that fraud system's own interface and processes accessible to an analyst for inspection.

Moreover, the transaction does not have to be occurring in real time with the user. This means that a history of known (subsequently determined or identified as fraudulent by the card user can be viewed by the user (can be a risk agent of the issuing bank 105, the card association 106, or backend merchant payer/payee system 108). The user can toggle through the list of known fraudulent transaction and select a particular one to inspect within the front-end interface of an instance of the automated fraud assistant interface 107A-107D, which causes the transaction information for the selected transaction to be rendered as shown in the FIG. 1B.

It is to be noted that selection of a transaction for population to an instance of the automated fraud assistant interface 107A-107D can occur in a variety of manners, some of which were detailed above. For instance, an existing fraud detection system can supply transactions as known or potential fraudulent transactions. Some, real time analysis may provide a suspect transaction, etc.

The transaction screen of the FIG. 1B includes a variety of fields automatically populated with values from the transaction information for the selected transaction as well as a column from which the user can select to use a particular field (to the left of the fields in the transaction screen). To the right of the transaction screen includes pre-populated default operators relevant to the transaction information for the selected transaction such as "=" and ">=." It is noted that other operators may exist as well, some of which may be user created and defined. To the right of the operators is a value populated from the transaction information for the selected transaction. The user can name the rule (which is being created for automated fraud detection based on the selected transaction), supply a score (for example on a scale of 0-100, other scales may be used as well), supply an indication as whether to apply the rule being created, and an additional original code option. There is also a save option with the rendered transaction screen.

As can be seen from the transaction screen, the user can edit or modify the pre-populated fields to modify a rule being created for the selected transaction or leave all the pre-populated fields as is and simply click to save (which results in a one-click new fraud rule being generated for the selected transaction).

The purpose of rendering the transaction screen to the user is for the user to generate a fraud rule for detecting this and other subsequent transactions that pass through to the issuing bank 105, the card association 106, or the backend merchant payer/payee system 108. The rules are conditional statements generated by the automated fraud assistant interfaces 107A-107D based on the fields as pre-populated or as custom-edited by the user. These conditional statements are then evaluated against transaction information for the subsequent transactions to determine if any of the subsequent transactions are deemed to be fraudulent.

The score in the transaction screen supplied by the user or accepted as pre-populated by the automated fraud assistant interfaces 107A-107D can be considered a weight that is used by the issuing bank 105, the card association 106, and/or the backend merchant payer/payee system 108 to compare against a threshold to determine whether fraud is likely or whether other policies need to be followed, such as calling the customer associated with the transaction for verification or initiating custom verification procedures defined by the enterprise or by the consumer.

When the user clicks save, the automated fraud assistant interfaces 107A-107D produce a rule that is immediately available for evaluating transactions, assuming the active option was selected. In some cases, the rule produced may be deactivated until the enterprise determines it is of sufficient quality to activate (see the active option in the transaction screen).

In another instance, the user can select multiple transactions and have fields populated in a single different rendered screen (not shown in the FIG. 1B), the fields from multiple transactions can be edited or accepted as is to generate a rule based on transaction information from multiple different transactions.

It is noted that the fields in the rendered transaction screen of the FIG. 1B can be customized based on an enterprise rule-based fraud detection system. Moreover, the automated fraud assistant interfaces 107A-107D can be configured to produce rules in a format recognized by a specific enterprise rule-based fraud detection system.

In some cases, the automated fraud assistant interfaces 107A-107D are preconfigured to handle a variety of different fraud detection rule formats.

In an embodiment, the rule format is a processing parameter passed to the automated fraud assistant interfaces 107A-107D.

In an embodiment, the rule format can be selected via a drop down menu rendered in the transaction screen for user selection.

In an embodiment, the rule format is resolved based on an identifier for the enterprise known to use a specific fraud detection system.

The automated fraud assistant interfaces 107A-107D improve the efficiency of enterprise rule-based fraud detection systems by automating rule creation. The automated fraud assistant interfaces 107A-107D allow for less skilled risk analysts or junior risk analysts to rapidly produce rules for application in an enterprise's fraud detection system.

In an embodiment, the automated fraud assistant interfaces 107A-107D are implemented as a front-end risk analyst interface to an enterprise fraud detection system.

In an embodiment, the automated fraud assistant interfaces 107A-107D are integrated into an enterprise fraud detection system as an enhanced enterprise fraud detection system.

In an embodiment, the automated fraud assistant interfaces 107A-107D are web-based or cloud services accessible to the risk analysts that produces a rule in a desired or selected enterprise fraud system format and can be uploaded to the enterprise fraud system separately by the risk analyst once delivered, perhaps as a file, script, and/or string or text by the automated fraud assistant interfaces 107A-107D.

In an embodiment, the card schemes 104 also use an instance of the automated fraud detection assistant interface 107A. So, any enterprise involved in routing, processing, and/or authorizing can utilize an automated fraud detection assistance interface (one of 107A-107D).

In an embodiment, an external server provides network access to the card schemes 104, the issuing bank 105, the card associations 106, and the backend merchant payer/payee system 108 for accessing configured instances of the automated fraud assistant interface 107A-107D for each of the particular entities.

These and other embodiments are now discussed with reference to the FIGS. 2-4.

Figure 2:
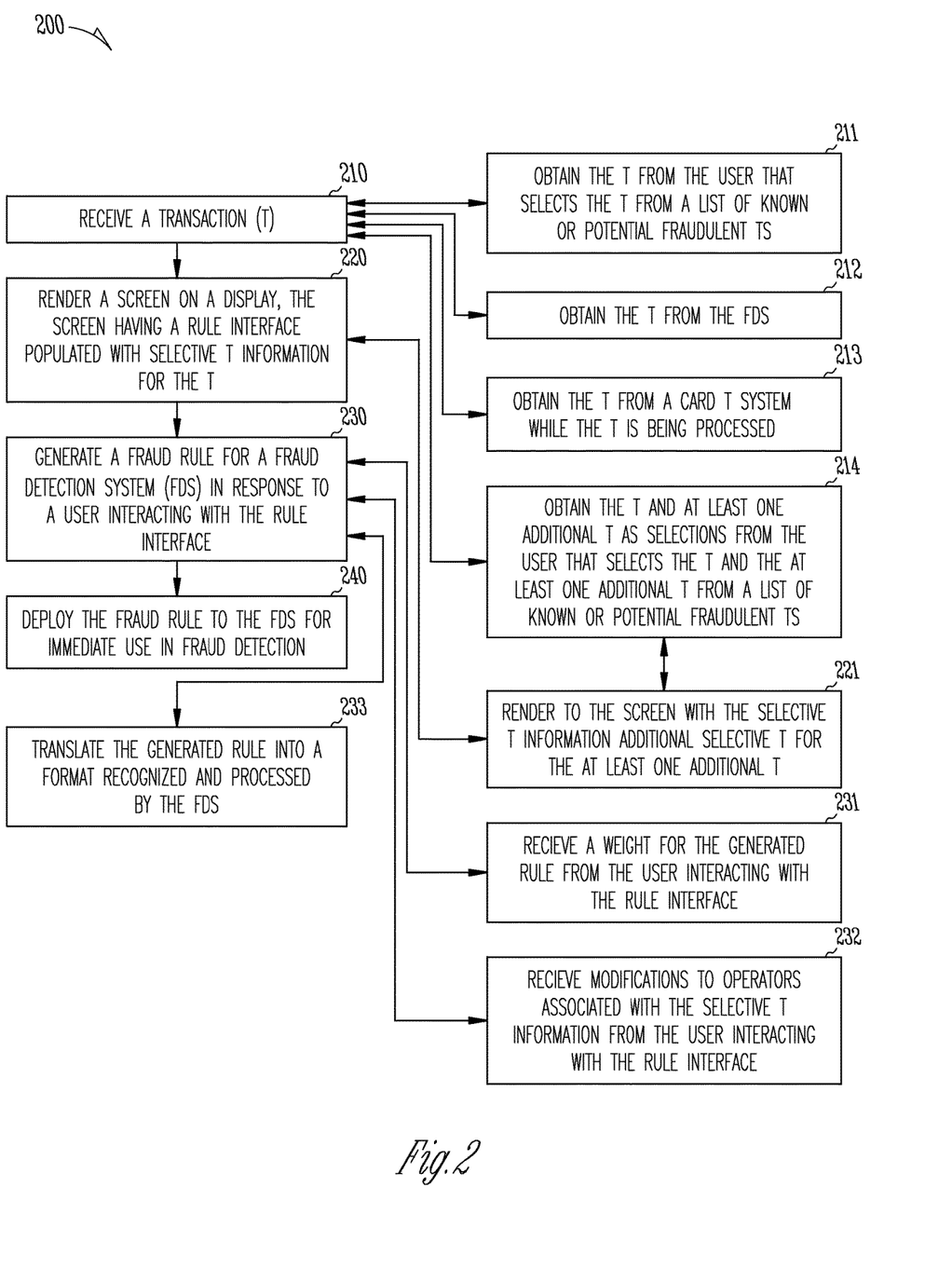
FIG. 2 is a diagram of a method for automated fraud detection, according to an example embodiment.

FIG. 2 is a diagram of a method 200 for automated fraud detection, according to an example embodiment. The method 200 (hereinafter "fraud rule generation interface") is implemented as one or more software modules as instructions programmed and residing in memory and/or on a non-transitory computer-readable (processor-readable) storage; the instructions executed by one or more processors. The processors are specifically configured and programmed to process the fraud rule generation interface. The fraud rule generation interface may operate over one or more networks. Any such network can be wired, wireless, or a combination of wired and wireless.

In an embodiment, the fraud rule generation interface is one of the automated fraud assistant interfaces 107A-107D of the FIG. 1A.

At 210, the fraud rule generation interface receives a transaction. The transaction associated with an event for the transaction. In an embodiment, the transaction associated with a card transaction, such as a credit card, a debit card, a gift card, etc. The receipt of the transaction (or a transaction identifier or reference for the transaction) can originate from a variety of sources.

For example, at 211, the fraud rule generation interface obtains the transaction from the user that selects the transaction from a list of known or potential fraudulent transactions. This selection can be made from a different screen rendered to the display of a device that the user interacts with. That screen depicting the list of known or potential fraudulent transactions and when the user selects one or more of those transactions (as discussed below), the fraud rule generation interface obtains the selected transaction(s) for processing.

In another case, at 212, the fraud rule generation interface obtains the transaction from a fraud detection system. That is, the fraud detection system automatically communicates a detected fraudulent transactions to the fraud rule generation interface, such as through API calls or events monitored by the fraud rule generation interface and which are produced by the fraud detection system.

In still another situation, at 213, the fraud rule generation interface obtains the transaction from a card transaction system while it is being processed (in real time or near real time) for evaluation. This situation was discussed above with reference to the FIGS. 1A-1B.

In an embodiment, at 214, the fraud rule generation interface obtains the transaction and at least one additional transaction as selections from the user that selects the transaction and the at least one additional transaction from a list of known or potential fraudulent transactions. Here, multiple transactions are being used as the basis for creation of single new fraud detection rule for a fraud detection system (rule based system).

At 220, the fraud rule generation interface renders a screen on a display of a device that a user is interacting with. The screen includes a rule interface permitting the user to interact with fields and values presented within the screen. An example transaction screen that can server as a rule interface was presented above with reference to the FIG. 1B. The screen is also populated with selective transaction information from the transaction. This serves as a template or default proposed rule to the user.

In an embodiment of 214 and 220, at 221, the fraud rule generation interface renders to the screen with the selective transaction information additional selective transaction information for the at least one additional transaction. So, the screen includes transaction details from multiple transactions which serve as a basis for generating a single fraud detection rule.

At 230, the fraud rule generation interface generates a fraud rule for a fraud detection system (rule based system) in response to a user interacting with the rule interface, and perhaps modifying fields and values of the proposed rule presented in the screen on the display.

In an embodiment, at 231, the fraud rule generation interface receives a weight or a score for the generated rule from the user who is interacting with the rule interface.

In an embodiment, at 232, the fraud rule generation interface receives modifications to operators associated with the selective transaction information from the user who is interacting with the rule interface.

In an embodiment, at 233, the fraud rule generation interface translates the generated rule into a format recognized and capable of being processed by the fraud detection system. So, the fraud rule generation interface can be customized to work with a variety of different native fraud detection systems.

According to an embodiment, at 240, the fraud rule generation interface deploys the fraud rule to the fraud detection system for immediate use in fraud detection.

Figure 3:
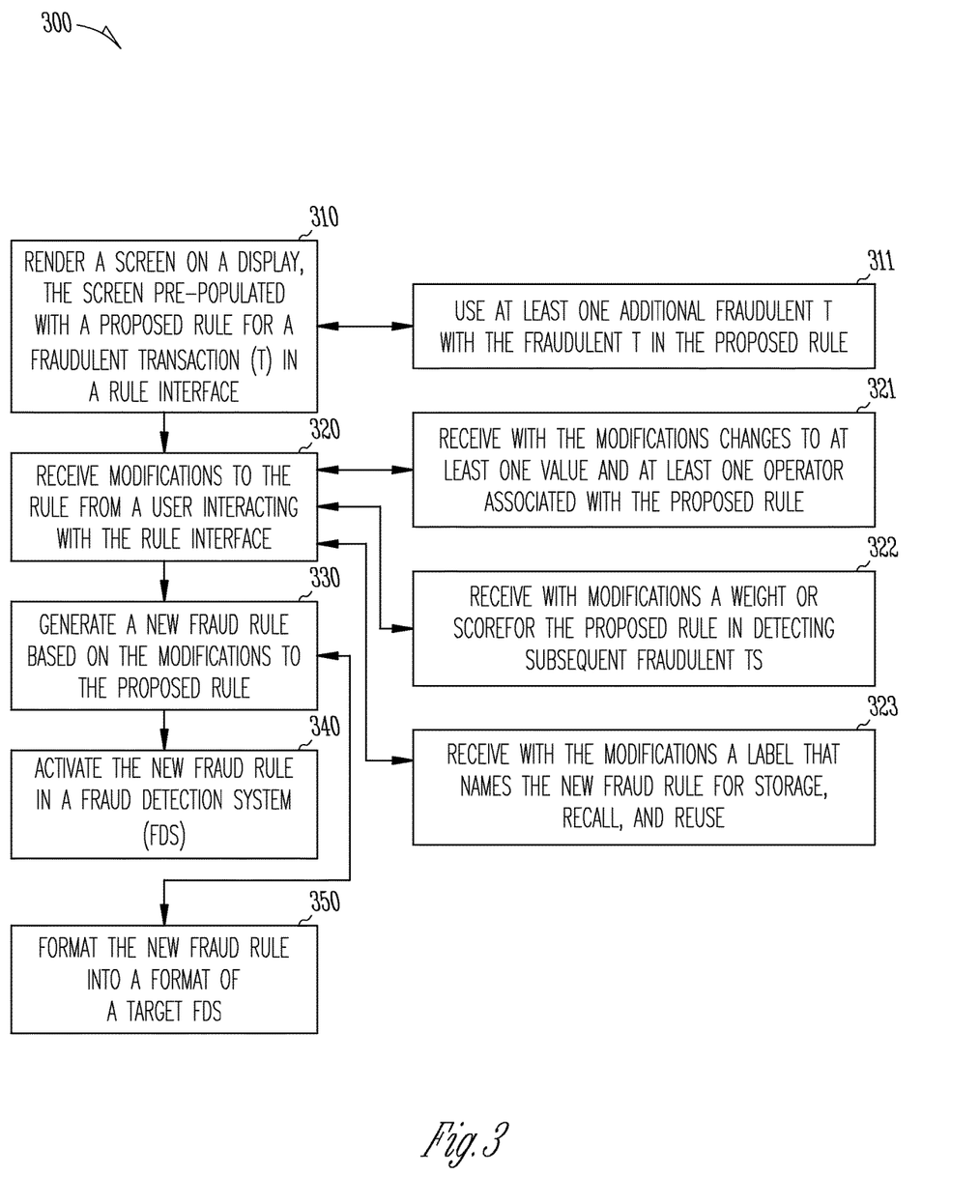
FIG. 3 is a diagram of a method for automated fraud detection, according to an example embodiment.

FIG. 3 is a diagram of a method 300 for automated fraud detection, according to an example embodiment. The method 300 (hereinafter "fraud rule generator") is implemented as one or more software modules as instructions programmed and residing in memory and/or on a non-transitory computer-readable (processor-readable) storage; the instructions executed by one or more processors. The processors are specifically configured and programmed to process the fraud rule generator. The fraud rule generator may operate over one or more networks. Any such network can be wired, wireless, or a combination of wired and wireless.

The fraud rule generator provides another and in some ways enhanced perspective of the fraud rule generation interface represented by the method 200 of the FIG. 2.

In an embodiment, the fraud rule generator is one of the automated fraud assistant interfaces 107A-107D of the FIG. 1A.

At 310, the fraud rule generator renders a screen on a display. The screen is pre-populated with a proposed rule for a given fraudulent transaction in a rule interface.

According to an embodiment, at 311, the fraud rule generator uses at least one additional fraudulent transaction with the fraudulent transaction in the single proposed rule. So, the proposed rule can be a combination of details from multiple different fraudulent transactions.

At 320, the fraud rule generator receives modifications to the rule from a user interacting with the rule interface.

In an embodiment, at 321, the fraud rule generator receives with the modifications changes to at least one value and at least one operator associated with the proposed rule. This was depicted above with reference to the FIG. 1B.

In an embodiment, at 322, the fraud rule generator receives with the modifications a weight or score for the proposed rule in detecting subsequent fraudulent transactions when deployed to a fraud detection system.

In an embodiment, at 323, the fraud rule generator receives with the modifications a label that names the new fraud rule for storage, recall, and reuse.

At 330, the fraud rule generator generates a new fraud rule based on the modifications to the proposed rule as received from the user interacting with the rule interface.

According to an embodiment, at 340, the fraud rule generator activates the new fraud rule in a fraud detection system for immediate detection of fraudulent transactions.

In an embodiment, at 350, the fraud rule generator formats the new fraud rule into a format of a target fraud detection system that is to process the new fraud rule.

Figure 4:
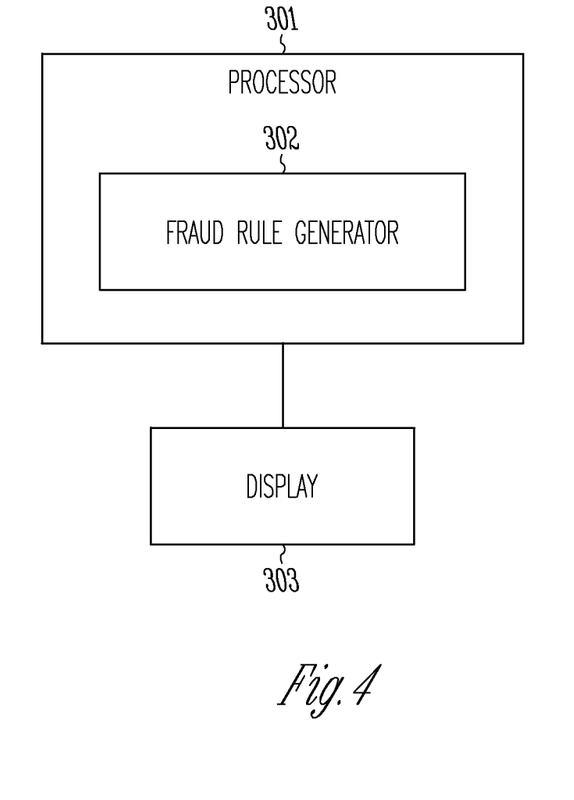
FIG. 4 is a diagram of automated fraud detection system, according to an example embodiment.

FIG. 4 is a diagram of automated fraud detection system 400, according to an example embodiment. The automated fraud detection system 400 includes one or more processors that are specifically configured to perform, inter alia, the processing associated with the automated fraud assistant interfaces 107A-107D, and the methods 200 and 300 of the FIGS. 2 and 3, respectively. The automated fraud detection system 400 may also include a variety of other hardware components, such as network adapters, memory, display screen(s), input mechanisms, and the like. Furthermore, the automated fraud detection system 400 may be operational over one or more networks and the networks can be wired, wireless, or a combination of wired and wireless.

The automated fraud detection system 400 includes a processor 301, a fraud rule generator 302, and a display 303.

The fraud rule generator 302 is implemented as one or more software modules having executable instructions that reside in memory and/or non-transitory computer-readable storage media, and the instructions execute on the processor 301.

In an embodiment, the fraud rule generator 302 is one of the automated fraud assistant interfaces 107A-107D of the FIG. 1.

In an embodiment, the fraud rule generator 302 is the fraud rule generation interface for the method 200 of the FIG. 2.

In an embodiment, the fraud rule generator 302 is the fraud rule generator for the method 300 of the FIG. 3.

The fraud rule generator 302 is configured and adapted to: render a screen on the display 303 (the screen having a rule interface pre-populated with a proposed fraud rule for a selected transaction) and generate a new fraud rule based on modifications made to the proposed fraud rule from the rule interface.

In an embodiment, the fraud rule generator 302 is further configured to pre-populate the proposed fraud rule for at least one additional selected transaction (a single rule for multiple different transactions).

In an embodiment, the fraud rule generator 302 is further configured to: format the new fraud rule in a format recognized by and capable of being processed by a fraud detection system and deploy the new fraud rule in that fraud detection system for immediate fraud detection of transactions being processed.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving, by a fraud rule generation interface that is executing on a hardware processor, a listing of fraud transactions provided by a fraud detection system;
    presenting, by the fraud rule generation interface, the listing to a user for making selections;
    receiving, by a fraud rule generation interface, a particular transaction as a transaction selection made by the user from the listing;
    rendering, by the fraud rule generation interface, a screen on a display, wherein rendering further includes generating the screen with transaction fields for the particular transaction provided to a left side of the screen and with default fraud rule operators to a tight side of the screen;
    obtaining, by the fraud rule generation interface, a selected field from the transaction fields from the user as a particular transaction field and obtaining a user-defined operator not provided in the default fraud rule operators as an input received from the user in place of any selection from the default rule operators;
    populating, by the fraud rule generation interface, a value obtained from transaction information associated with the particular transaction that corresponds to the particular transaction field;
    evaluating, by the fraud rule generation interface, the user-defined operator with the particular transaction field populated with the value;
    generating by the fraud rule generation interface, a fraud rule for the fraud detection system based on: the particular transaction field, the user-defined operator, and the value; and
    deploying, by the fraud rule generation interface, the fraud rule to the fraud detection system for immediate processing by the fraud detection system in fraud detection against other transactions processed by the fraud detection system based on the particular transaction field, the user-defined operator, and the value for the particular transaction field of the transaction.

2. The method of claim 1, wherein receiving the listing further includes receiving the particular transaction from the fraud detection system as the particular transaction is being processed by a card transaction system interfaced to the fraud detection system.

3. The method of claim 1, wherein receiving the particular selection further includes:
   presenting, by d rule generation interface, a second list comprising known fraudulent transactions; and
   receiving, by the fraud rule generation interface, at least one additional transaction as additional selections made by the user from the second list.

4. The method of claim 1, wherein generating further includes receiving a weight for the fraud rule from the user interacting with the rule interface.

5. The method of claim 1, wherein generating further includes translating the fraud generated rule into a format that the fraud detection system processes.

6. A method, comprising:
   receiving, by a fraud rule generator that executes on a hardware processor, a transaction from a fraud detection system;
   obtaining, by the fraud rule generator, transaction fields corresponding to transaction information associated with the transaction;
   rendering, by the fraud rule generator, a screen on a display;
   providing, by the fraud rule generator, a rule interface within the screen for interaction by a user;
   populating, by the fraud rule generator, the screen with a proposed rule for a fraudulent transaction for interaction by a user through the rule interface, wherein populating further includes populating the screen with the transaction information for the transaction into the rule interface with the corresponding transaction fields for the transaction situated to a left side of the screen and with default fraud operators that require evaluation with the transaction fields situated to a right side of the screen within the rule interface;
   receiving, by the fraud rule generator, modifications to the rule from the user who interacts with the rule interface based on particular selections made by the user to the transaction fields and the default fraud rule operators, wherein receiving further includes receiving a particular transaction field selection from the user through the rule interface, receiving input from the user through the rule interface, defining a user-created operator from the input, and associating the user-created operator with the particular transaction field selection as at least one of the modifications to the rule;
   automatically populating, by the fraud rule generator, values from the transaction information of the transaction for the particular selections that correspond to transaction field selections;
   evaluating, by the fraud rule generator, the values with the user-created operator;
   generating, by the fraud rule generator, a new fraud rule based on the modifications to the proposed rule and the values obtained from the transaction information; and
   providing, by the fraud rule generator, the new fraud rule for a fraud detection system that evaluates the new fraud rule for new transactions.

7. The method of claim 6 further comprising, formatting the new fraud rule into a format that the fraud detection system processes.

8. The method of claim 6, wherein rendering further includes using at least one additional fraudulent transaction with the fraudulent transaction in the proposed rule.

9. The method of claim 6, wherein receiving the modifications further includes receiving with the modifications through user interactions with the rule interface a weight or score for processing the new fraud rule against the new transactions.

10. The method of claim 6, wherein receiving the modifications further includes receiving with the modifications through user interactions with the rule interface a label that names the new fraud rule for storage, recall, and reuse by the fraud rule generator, the rule interface, and the fraud detection system.

11. A system, comprising:
   a processer;
   a non-transitory computer-readable storage medium comprising, executable: instructions for a fraud rule generator and a rule interface;
   a display interfaced to the processor; and
   the executable instructions executed by the processor from the non-transitory computer-readable storage medium causing the processor to perform operations for the fraud rule generator and the rule interface comprising:
      receiving, by the executable instructions corresponding to the fraud rule generator, a transaction from a fraud detection system;
      obtaining, the executable instructions corresponding to the fraud rule generator, transaction fields associated with transaction information for the transaction;
      rendering, by the executable instructions corresponding to the fraud rule generator, a screen on the display;
      providing, by the executable instructions corresponding to the fraud rule generator, the executable instructions corresponding to the rule interface for interaction with the screen by a user;
      populating, by the executable instructions corresponding to the fraud rule generator, the screen with a proposed fraud rule for the transaction;
      presenting, by the executable instructions corresponding to the rule interface, the screen on the display with the transaction fields associated with the transaction to a left side of the screen and with default rule operators that are to be evaluated against any selected transaction field to a right side of the screen;
      interacting, by the executable instructions corresponding to the rule interface, with the user and obtaining particular transaction field selections from the transaction fields and particular operator selections from the default rule operators and obtaining at least one particular transaction field selection without a corresponding particular default rule operator selection rather, the user provides input for a user-created and defined operator to evaluate with the at least one particular transaction field selection;
      automatically obtaining, by the executable instructions corresponding to the fraud rule generator, values for corresponding transaction fields associated with the particular transaction field selections from the transaction information;
      evaluating, by the executable instructions corresponding to the fraud rule generator, the values with at least one value evaluated with user-created and defined operator;
      generating, by the executable instructions corresponding to the fraud rule generator, a new fraud rule based on modifications made to the proposed fraud rule as defined by the user through the rule interface with the particular transaction field selections, the particular operator selections, the user-created and defined operator for the transaction, and the values for the transaction; and providing, by the executable instructions corresponding to the fraud rule generator, the new fraud rule to the fraud detection system for processing with new transactions.

* * * * *